US011465530B2

(12) United States Patent
Tsai

(10) Patent No.: US 11,465,530 B2
(45) Date of Patent: Oct. 11, 2022

(54) BATTERY REGENERATIVE STRENGTH CONTROL METHOD FOR ELECTRONIC VEHICLE

(71) Applicant: Acer Incorporated, New Taipei (TW)

(72) Inventor: Chin-Yi Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 133 days.

(21) Appl. No.: 17/036,932

(22) Filed: Sep. 29, 2020

(65) Prior Publication Data

US 2021/0170904 A1 Jun. 10, 2021

(30) Foreign Application Priority Data

Dec. 5, 2019 (TW) ................................ 108144494

(51) Int. Cl.
*B60L 58/10* (2019.01)

(52) U.S. Cl.
CPC ........... *B60L 58/10* (2019.02); *B60L 2240/12* (2013.01); *B60L 2240/549* (2013.01)

(58) Field of Classification Search
CPC ........ B60L 58/15; B60L 3/12; B60L 2240/12; B60L 2240/549; B60L 58/10; Y02T 10/70
See application file for complete search history.

(56) References Cited

U.S. PATENT DOCUMENTS

| | | | | |
|---|---|---|---|---|
| 5,861,724 A * | 1/1999 | Ackerson | H02P 3/14 318/139 |
| 8,957,610 B2 | 2/2015 | Lee | |
| 2012/0256568 A1* | 10/2012 | Lee | B60L 7/26 429/150 |
| 2018/0257656 A1* | 9/2018 | Zhao | B60L 7/10 |
| 2020/0172109 A1* | 6/2020 | Son | B60W 40/072 |
| 2020/0231045 A1* | 7/2020 | Shin | B60L 53/60 |

FOREIGN PATENT DOCUMENTS

| | | |
|---|---|---|
| CN | 103448570 A | 12/2013 |
| CN | 103660960 A | 3/2014 |
| CN | 106410297 A | 2/2017 |
| CN | 106740261 A | 5/2017 |
| CN | 106828114 A | 6/2017 |
| CN | 110218781 A | 9/2019 |
| CN | 110682787 A | 1/2020 |
| DE | 10 2017 211 248 A1 | 1/2019 |
| JP | 2001-95106 A | 4/2001 |
| TW | 201720031 A | 6/2017 |
| TW | 201815007 A | 4/2018 |

* cited by examiner

*Primary Examiner* — Jared Fureman
*Assistant Examiner* — Duc M Pham
(74) *Attorney, Agent, or Firm* — Birch, Stewart, Kolasch & Birch, LLP

(57) ABSTRACT

A battery regenerative strength control method for an electric vehicle is provided. The method includes: in an initial stage, gradually adjusting a current regenerative strength; in a real-time adjustment stage, dynamically adjusting the current regenerative strength; calculating a corrected regenerative strength according to a historical data when a current time point reaches at least one correction check point; and comparing the corrected regenerative strength with the current regenerative strength to decide whether to update the current regenerative strength.

8 Claims, 5 Drawing Sheets

|  | D1 | D2 | D3 $Duty_c$ D4 | D5 |  |
|---|---|---|---|---|---|
| S1 | A11 | A12 | A13 | A14 | A15 |
| $S_{now}$ | AN1 | AN2 | AN3　　AN4 $A_{now}$ |  | AN5 |
| S2 | A21 | A22 | A23 | A24 | A25 |

BATTERY REGENERATIVE STRENGTH CONTROL METHOD FOR ELECTRONIC VEHICLE

This application claims the benefit of Taiwan application Serial No. 108144494, filed Dec. 5, 2019, the subject matter of which is incorporated herein by reference.

BACKGROUND OF THE INVENTION

Field of the Invention

The invention relates in general to a battery regenerative strength control method for an electric vehicle.

Description of the Related Art

As the problem of global warming worsens, e-transportation (including electric car, electric locomotive, electric bike) has become one of the solutions. When it comes to the implementation of e-transportation, battery is very crucial. Only the e-transportation with long cruising endurance can gain a great popularity. The improvement of battery endurance can start with the increase of battery capacity. However, such improvement involves factors such as technology and cost. Another method for improving battery endurance is through battery regeneration. That is, when an electric vehicle or an electric bike in use is moving, the battery can be regenerated to increase its available capacity.

When the electric vehicle is moving, if the driver releases the accelerator pedal, the vehicle will keep moving due to the inertia. Meanwhile, the voltage is no more outputted to the motor, and the rotation of motor is driven by the inertia. Due to the electromagnetic induction phenomenon, the magnetic field of rotation will generate an induced current. With a reverse control, the generated electricity can be guided to the positive polarity of the battery to charge the battery. The magnitude of regenerative current can be regulated by setting different pulse width modulation (PWM) duty cycles.

To increase the endurance of the battery more effectively, the power is regenerated as much as possible. With an efficient battery regenerative strength control method, a maximum regenerative power can be obtained without damaging the battery pack.

SUMMARY OF THE INVENTION

According to one embodiment of the present invention, a battery regenerative strength control method for an electric vehicle is provided. The method includes: in an initial stage, gradually adjusting a current regenerative strength; in a real-time adjustment stage, dynamically adjusting the current regenerative strength; calculating a corrected regenerative strength according to a historical data when a current time point reaches at least one correction check point; and comparing the corrected regenerative strength with the current regenerative strength to decide whether to update the current regenerative strength.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1A:
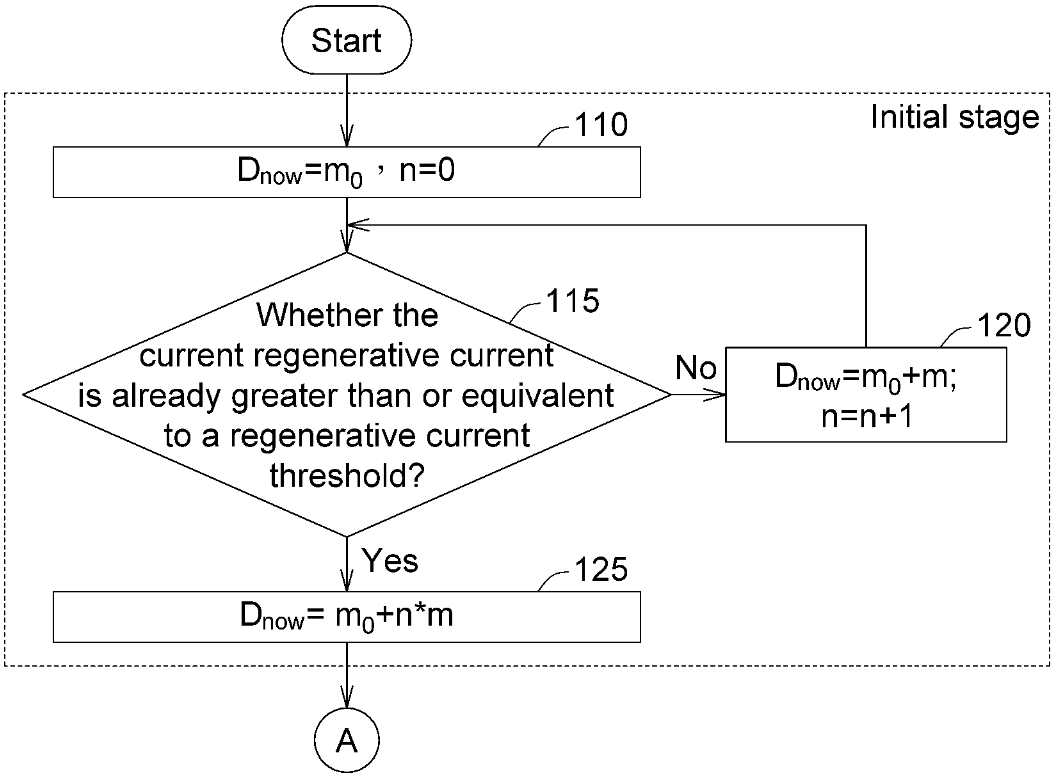
FIG. 1A and FIG. 1B are flowcharts of a battery regenerative strength control method for an electric vehicle according to an embodiment of the present invention.
Figure 1B:
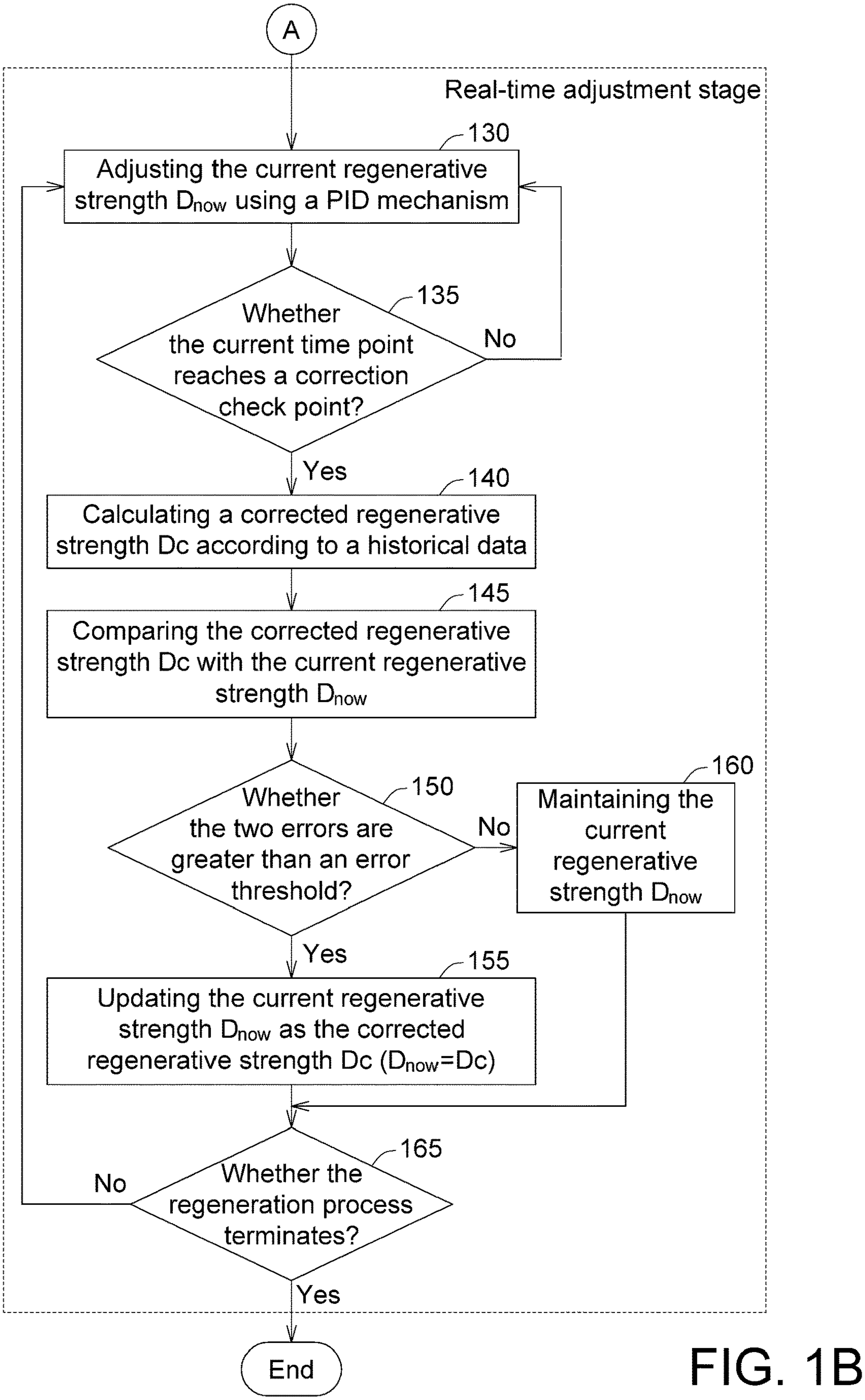
Figure 2:
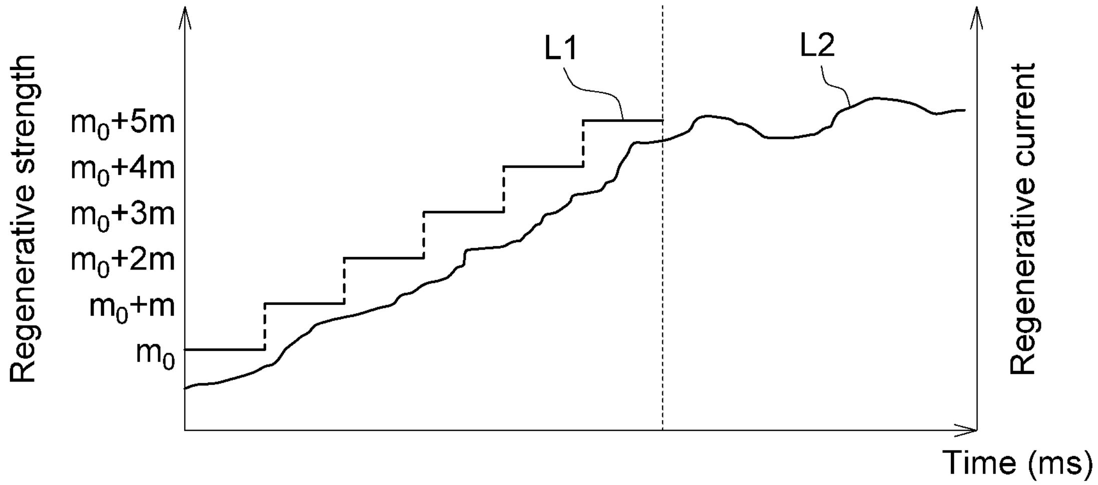
FIG. 2 is a relation diagram of the regenerative strength and regenerative current of an electric vehicle vs time according to an embodiment of the present invention.
Figure 3:
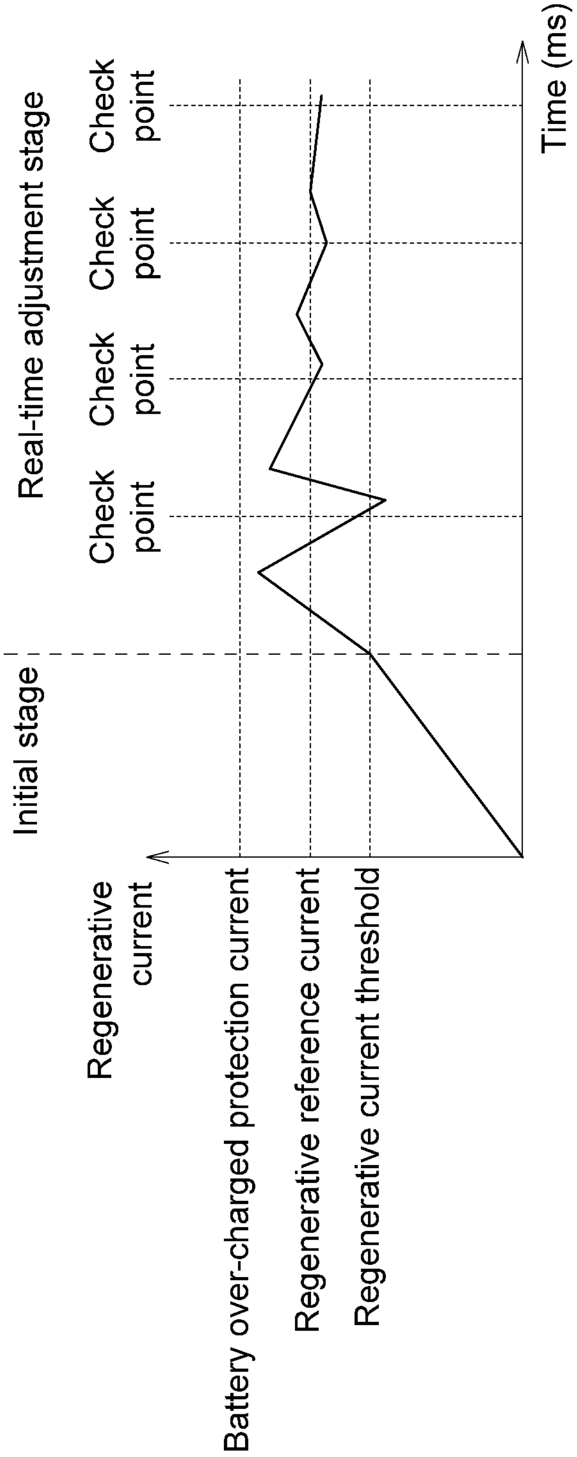
FIG. 3 is a diagram of the regenerative current of an electric vehicle vs time according to an embodiment of the present invention.

FIG. 1A and FIG. 1B are flowcharts of a battery regenerative strength control method for an electric vehicle according to an embodiment of the present invention. FIG. 2 is a relation diagram of the regenerative strength and regenerative current of an electric vehicle vs time according to an embodiment of the present invention. FIG. 3 is a diagram of the regenerative current of an electric vehicle vs time according to an embodiment of the present invention.

The battery regenerative strength control method for an electric vehicle according to an embodiment of the present invention includes an initial stage and a real-time adjustment stage. In the initial stage, a current regenerative strength is gradually adjusted. In the real-time adjustment stage, the current regenerative strength is dynamically adjusted in a real-time manner.

Firstly, the method begins at step 110, the current regenerative strength $D_{now}$ is set as an initial value $m_0$, and the round parameter n is set (n is an integer, and the initial value of n can be set as 0), wherein, the round parameter n represents the number of rounds in the initial stage. The initial value $m_0$ can be regarded as a minimum regenerative strength.

Next, the method proceeds to step 115, whether the current regenerative current is already greater than or equivalent to a regenerative current threshold is determined, wherein the regenerative current threshold is such as the constant current (CC) of the battery.

If the determination in step 115 is negative, this implies that the current regenerative strength $D_{now}$ is too small and needs to be increased, and the method proceeds to step 120. In step S120, the current regenerative strength $D_{now}$ is increased by m (m represents the regenerative strength increased in each round) ($D_{now}=m_0+m$), the value of n is added by 1 (n=n+1) in the next round, and the method returns to step 115.

If the determination in step 120 is affirmative, this implies that the current regenerative strength $D_{now}$ is sufficient and the method can proceed to the real-time adjustment stage. In step 125, the value of the current regenerative strength $D_{now}$ is set as: $D_{now}=m_0+n*m$, and the method enters the real-time adjustment stage.

In the embodiments of the present embodiment, "regenerative strength" and "pulse width modulation (PWM) duty cycle" carry the same meaning. That is, the regenerative strength includes a pulse width modulation (PWM) duty cycle.

That is, in the initial stage, the battery is regenerated with the minimum regenerative strength $m_0$, the current strength is gradually increased, and the current is increased by m until the regenerative current value reaches the pre-determined regenerative current threshold.

As indicated in FIG. 2, curve L1 represents the relation of regenerative strength vs time; curve L2 represents the relation of regenerative current vs time. Let FIG. 2 be taken for example. When the current regenerative strength $D_{now}$ is increased to $m_0$+5 m, that is, $D_{now}$=$m_0$+5 m, the regenerative current reaches the regenerative current threshold, and the method of the present invention can enter the real-time adjustment stage. In principle, the regenerative current is positively correlated with the regenerative strength.

When the method enters the real-time adjustment stage, in step 130, the current regenerative strength $D_{now}$ is adjusted using a PID mechanism, wherein PID represents proportion (P), integral (I) and derivative (D). PID is a control algorithm of the control system. Through the control algorithm, the control system can be continuously adjusted to reach a pre-determined reference value and maintain at the reference value. PID refers three different physical meanings: P refers to the correction of the current errors; I refers to the correction of past errors; and D refers to the prediction. Depending on the system type or the control object, the three elements of PID can be fully or partly used (for example, only PI is used). Considering the system complexity of the present invention, PI alone would meet the requirement. However, the present invention is not limited thereto, and in other possible embodiments of the present invention, the regenerative strength control can be performed using PID without breaching the spirit of the present invention.

In the embodiments of the present invention, the PI control mathematical model can be expressed as:

$$PI\_output=K_p \cdot e(t)+K_i \cdot \int_0^t e(\pi)d\pi$$

Wherein, PI_output represents PI output (that is, the regenerative strength of the present invention embodiment); $K_p$ and $K_i$ respectively represent P-adjustment parameter and I-adjustment parameter; e (t) represents current error, $\int_0^t e(\pi)d\pi$ represents the accumulation of past errors.

In other possible embodiments of the present invention, the PI control can also be performed in step 130 to adjust the regenerative current in a real-time manner (that is, to increase or decrease the regenerative current). The current obtained from the PI control of regenerative current is further processed with the PI control of regenerative strength. The PI control of regenerative current is similar to the PI control of regenerative strength, and the similarities are not repeated here.

Then, the method proceeds to step 135, whether the current time point reaches a correction check point is determined. In the embodiments of the present embodiment, the real-time adjustment stage can have at least one correction check point. In the embodiments of the present embodiment, the correction check point is for checking whether the current regenerative strength $D_{now}$ is over-deviated according to the historical data and for deciding whether to update the current regenerative strength $D_{now}$. FIG. 3 illustrates a number of correction check points according to an embodiment of the present invention.

If the determination in step 135 is affirmative, that is, the current time point reaches a correction check point, then the method proceeds to step 140. In step 140, a corrected regenerative strength Dc is calculated according to a historical data, wherein, the corrected regenerative strength Dc, which represents the corrected regenerative strength inferred from historical data, is for determining whether the current regenerative strength $D_{now}$ needs to be corrected.

Figure 4:
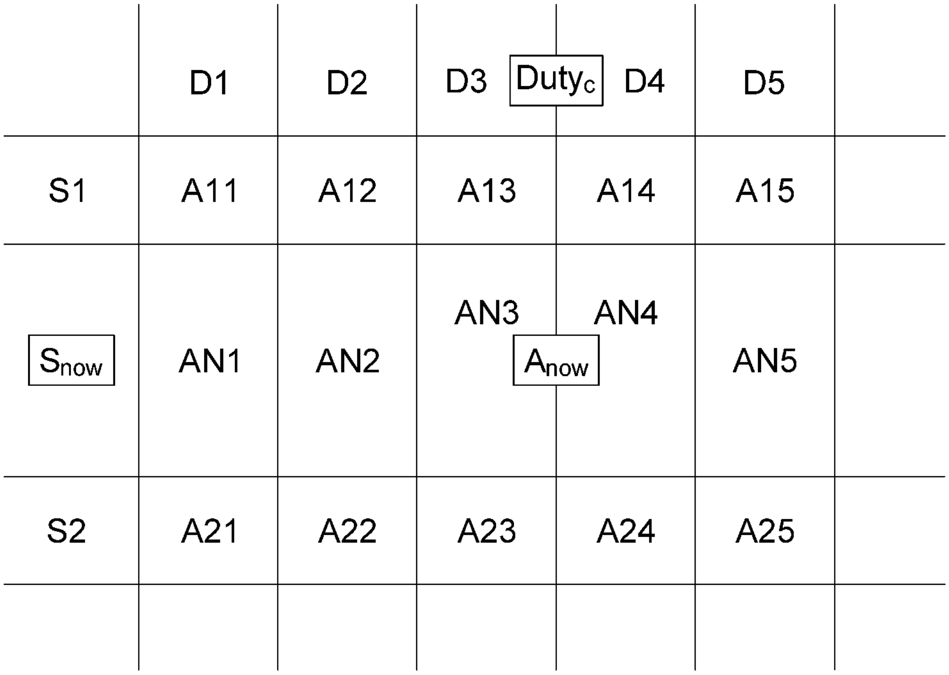
FIG. 4 is a schematic diagram of the calculation of corrected regenerative strength Dc according to an embodiment of the present invention.

FIG. 4 is a schematic diagram of the calculation of corrected regenerative strength Dc according to an embodiment of the present invention. As indicated in FIG. 4, designations S1 and S2 represent historical vehicle speeds; designations D1-D5 represent historical regenerative strengths; designations A11-A15 and designations A21-A25 represent historical regeneration currents. That is, the historical data used in the embodiments of the present embodiment include a historical vehicle speed, a historical regenerative strength and a historical regeneration current, and the historical data can be measured in advance (that is, the regenerative currents corresponding to different vehicle speeds and different regenerative strength can be measured in advance). The historical data can be presented in the form of a matrix. When the vehicle speed is S1 and the regenerative strength is D1, the measured regenerative current is A11 and is recorded as a history data, and the rest can be obtained by the same analogy. Although FIG. 4 only illustrates 2 items of historical vehicle speeds, 5 items of historical regenerative strengths and 10 items of historical regeneration currents, the present invention is not limited thereto.

Designation "$S_{now}$" represents current vehicle speed. It is assumed that the current vehicle speed $S_{now}$ is between the historical vehicle speed S1 and S2 of the historical data.

The correction current values AN1-AN5 are calculated according to the historical speeds, the historical regenerative currents, and the current speeds. For example, AN1 can be calculated according to the formula:

$$AN1 = A11 + (A21 - A11) \times \left(\frac{S_{now} - S1}{S2 - S1}\right).$$

The rest correction current values AN2-AN5 can be obtained by the same analogy.

Then, the corrected regenerative strength Dc is calculated according to a historical regenerative strength, a correction current value and a current regenerative current. If the current regenerative current $A_{now}$ is between the correction current values AN3 and AN4 (the other scenarios can be obtained by the same analogy), then the corrected regenerative strength Dc can be expressed as:

$$D_c = D3 + (D4 - D3) \times \left(\frac{A_{now} - AN3}{AN4 - AN3}\right).$$

In step 145, the corrected regenerative strength Dc is compared with the current regenerative strength $D_{now}$. In step 150, whether the two errors are greater than an error threshold is determined. If the two errors are greater than the error threshold, then the method proceeds to step 155. In step 155, the current regenerative strength $D_{now}$ is updated as the corrected regenerative strength Dc ($D_{now}$=Dc). If the two errors is less than error threshold, then the method proceeds to step 160. In step 160, the current regenerative strength $D_{now}$ maintains unchanged (not updated).

Then, the method proceeds to step 165, whether the regeneration process terminates is determined. Here, the regeneration process terminates when the driver kicks the accelerator pedal (switch) or when the electric vehicle completely halts (the vehicle speed is equivalent to 0). In the embodiments of the present embodiment, when the regeneration process starts, the regenerative strength control method of the present invention also starts; when the regeneration process terminates, the regenerative strength control method of the present invention also terminates.

If the regeneration process has not yet terminated (the determination in step 165 is negative), then the method returns to step 130, the current regenerative strength $D_{now}$ is adjusted using a PI mechanism. If the regeneration process terminates (the determination in step 165 is affirmative), then the regenerative strength control of the present invention also terminates.

Refer to FIG. 3. In the initial stage, a regenerative current is gradually increased (steps 110-125 of FIG. 1A). When the regenerative current reaches the regenerative current threshold, the method enters a real-time adjustment stage, the current regenerative strength $D_{now}$ is dynamically adjusted, and whether the current regenerative strength $D_{now}$ needs to be corrected according to a historical data is determined whenever a correction check point is reached. Through the above embodiments of the present invention, the regenerative current approaches the regeneration reference current.

As disclosed in the above embodiments of the present embodiment, the battery current regenerative strength is adjusted using the PI control mechanism in a real-time manner, and whether the current regenerative strength needs to be adjusted is further determined according to the historical data, such that a maximum regenerative power can be obtained without damaging the battery pack.

Moreover, the regenerative strength control method of the present invention can be used in an electrically power assisted cycle (EPAC) or electric locomotive controller and can further be integrated in current battery management system.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery regenerative strength control method for an electric vehicle, comprising:
- in an initial stage, gradually adjusting a current regenerative strength;
- in a real-time adjustment stage, dynamically adjusting the current regenerative strength;
- calculating a corrected regenerative strength according to a historical data when a current time point reaches at least one correction check point; and
- comparing the corrected regenerative strength with the current regenerative strength to decide whether to update the current regenerative strength.

2. The battery regenerative strength control method according to claim 1, wherein, in the initial stage, setting the current regenerative strength as an initial value and setting a round parameter;
- determining whether a current regenerative current is already greater than or equivalent to a regenerative current threshold; and
- if the current regenerative current is not yet greater than or equivalent to the regenerative current threshold, adjusting the current regenerative strength, and increasing the round parameter until the current regenerative current is greater than or equivalent to the regenerative current threshold.

3. The battery regenerative strength control method according to claim 1, wherein, the regenerative strength comprises a pulse width modulation (PWM) duty cycle.

4. The battery regenerative strength control method according to claim 3, wherein, in the real-time adjustment stage, the current regenerative strength is dynamically adjusted using a proportional integral (PI) mechanism.

5. The battery regenerative strength control method according to claim 1, wherein, in the real-time adjustment stage, a current PI control is performed on the current regenerative current when dynamically adjusting the current regenerative strength.

6. The battery regenerative strength control method according to claim 5, wherein, the historical data comprises: a historical vehicle speed, a historical regenerative strength, and a historical regeneration current.

7. The battery regenerative strength control method according to claim 6, wherein, a plurality of correction current values are calculated according to the historical speed, the historical regeneration current, and a current vehicle speed; and
- the corrected regenerative strength is calculated according to the historical regenerative strength, the correction current values, and the current regeneration current.

8. The battery regenerative strength control method according to claim 7, wherein, when deciding whether to update the current regenerative strength,
- determining whether an error between the corrected regenerative strength and the current regenerative strength is greater than an error threshold;
- if the error is greater than the error threshold, updating the current regenerative strength as the corrected regenerative strength; and
- if the error is less than the error threshold, maintaining the current regenerative strength.

* * * * *